US 6,512,857 B1

(12) United States Patent
Hsu et al.

(10) Patent No.: US 6,512,857 B1
(45) Date of Patent: Jan. 28, 2003

(54) METHOD AND APPARATUS FOR PERFORMING GEO-SPATIAL REGISTRATION

(75) Inventors: Stephen Charles Hsu, Cranbury; Rakesh Kumar, Monmouth Junction; Harpreet Singh Sawhney, Cranbury; Jane Asmuth, Princeton, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/075,462

(22) Filed: May 8, 1998

Related U.S. Application Data

(60) Provisional application No. 60/046,075, filed on May 9, 1997.

(51) Int. Cl.⁷ .................................................. G06K 9/32
(52) U.S. Cl. ........................ 382/294; 382/295; 382/296
(58) Field of Search .............................. 382/284, 285, 382/287, 289, 294, 295, 296, 190, 305, 115, 103, 106; 702/5, 85; 345/121, 126, 435–438; 244/317; 348/117; 701/28, 207, 208, 213, 25, 209, 211

(56) References Cited

U.S. PATENT DOCUMENTS

| 4,179,824 A | * | 12/1979 | Marsh ....................... 35/10.24 |
| 4,234,313 A | * | 11/1980 | Fleishman .................. 343/6 R |
| 5,124,915 A | * | 6/1992 | Krenzel ...................... 364/420 |
| 5,557,347 A | * | 9/1996 | Johnson ................. 356/139.08 |
| 5,633,946 A | * | 5/1997 | Lachinski et al. .......... 382/103 |
| 5,649,032 A | | 7/1997 | Burt et al. .................. 382/284 |
| 5,657,402 A | | 8/1997 | Bender et al. ............. 382/284 |
| 5,784,431 A | * | 7/1998 | Kalend et al. ................ 378/65 |
| 5,963,664 A | * | 10/1999 | Kumar et al. ............... 382/154 |
| 5,968,109 A | * | 10/1999 | Israni et al. ................ 701/208 |

OTHER PUBLICATIONS

HongJiang Zhang, Atreyi Kankanhalli, Stephen W. Smoliar, "Automatic Partitioning of Full–Motion Video", Multimedia Systems (1993), pp. 10–28.

* cited by examiner

Primary Examiner—Leo Boudreau
Assistant Examiner—Kanji Patel
(74) Attorney, Agent, or Firm—W. J. Burke

(57) ABSTRACT

A system and method for accurately mapping between camera coordinates and geo-coordinates, called geo-spatial registration. The system utilizes the imagery and terrain information contained in the geo-spatial database to precisely align geographically calibrated reference imagery with an input image, e.g., dynamically generated video images, and thus achieve a high accuracy identification of locations within the scene. When a sensor, such as a video camera, images a scene contained in the geo-spatial database, the system recalls a reference image pertaining to the imaged scene. This reference image is aligned very accurately with the sensor's images using a parametric transformation. Thereafter, other information that is associated with the reference image can easily be overlaid upon or otherwise associated with the sensor imagery.

21 Claims, 4 Drawing Sheets

| PT. NO. | VIDEO IMAGE | | REFERENCE IMAGE | | REFERENCE IMAGE | |
|---|---|---|---|---|---|---|
| | INPUT POINT | | HAND MEASURED | | COMPUTED | |
| | x pix | y pix | x pix | y pix | x pix | y pix |
| POINTS IN THE CENTER OF THE IMAGE | | | | | | |
| 1 | 153 | 118 | 280 | 380 | 280.26 | 378.24 |
| 2 | 219 | 113 | 341 | 372 | 341.65 | 371.33 |
| 3 | 100 | 119 | 231 | 382 | 229.90 | 381.05 |
| 4 | 174 | 153 | 300 | 414 | 300.84 | 413.47 |
| 5 | 255 | 112 | 376 | 371 | 376.27 | 368.78 |
| 6 | 90 | 167 | 221 | 432 | 220.72 | 432.42 |
| POINTS IN THE EDGE OF THE IMAGE | | | | | | |
| 7 | 274 | 23 | 397 | 269 | 397.06 | 267.75 |
| 8 | 14 | 26 | 125 | 278 | 124.45 | 276.11 |
| 9 | 48 | 222 | 176 | 497 | 175.42 | 498.84 |
| 10 | 336 | 220 | 477 | 493 | 477.88 | 494.06 |
| 11 | 351 | 97 | 483 | 350 | 481.45 | 345.84 |
| 12 | 9 | 120 | 130 | 386 | 132.27 | 385.72 |
| OTHER POINTS IN THE IMAGE | | | | | | |
| 13 | 204 | 206 | 330 | 469 | 331.11 | 468.73 |
| 14 | 297 | 152 | 423 | 411 | 422.74 | 411.30 |
| 15 | 119 | 49 | 246 | 309 | 244.89 | 306.67 |

*FIG. 5*

METHOD AND APPARATUS FOR PERFORMING GEO-SPATIAL REGISTRATION

This non-provisional application claims the benefit of U.S. provisional application Ser. No. 60/046,075 filed May 9, 1997, which is hereby incorporated herein by reference.

The invention is generally related to image processing systems and, more specifically, to a method and apparatus for performing geo-spatial registration within an image processing system.

BACKGROUND OF THE INVENTION

The ability to locate scenes and/or objects visible in a video/image frame with respect to their corresponding locations and coordinates in a reference coordinate system is important in visually-guided navigation, surveillance and monitoring systems. Aerial video is rapidly emerging as a low cost, widely used source of imagery for mapping, surveillance and monitoring applications. The individual images from an aerial video can be aligned with one another and merged to form an image mosaic that can form a video map or provide the basis for estimating motion of objects within a scene. One technique for forming a mosaic from a plurality of images is disclosed in U.S. Pat. No. 5,649,032, issued Jul. 15, 1992, which is hereby incorporated herein by reference.

To form a "video map", a mosaic (or mosaics) of images may be used as a database of reference imagery and associated "geo-coordinates" (e.g., latitude/longitude within a reference coordinate system) are assigned to positions within the imagery. The geo-coordinates (or other image or scene attributes) can be used to recall a mosaic or portion of a mosaic from the database and display the recalled imagery to a user. Such a searchable image database, e.g., a video map, is disclosed in U.S. patent application Ser. No. 08/970,889, filed Nov. 14, 1997, and hereby incorporated herein by reference.

A system that images a scene that has been previously stored in the reference database and recalls the reference information in response to the current images to provide a user with information concerning the scene would have applicability in many applications. For example, a camera on a moving platform imaging a previously imaged scene contained in a database may access the database using the coordinates of the platform. The system provides scene information to a user. However, a key technical problem of locating objects and scenes in a reference mosaic with respect to their geo-coordinates needs to be solved in order to ascertain the geo-location of objects seen from the camera platform's current location. Current systems for geo-location, the mapping of camera coordinates to the geo-coordinates, use position and attitude information for a moving camera platform within some fixed world coordinates to locate the video frames in the reference mosaic database. However, the accuracy achieved is only on the order of tens to hundreds of pixels. This inaccuracy is not acceptable for high resolution mapping.

Therefore, there is a need in the art for a method and apparatus that identifies a location within an imaged scene with a sub-pixel accuracy directly from the imagery within the scene itself.

SUMMARY OF THE INVENTION

The disadvantages of the prior art are overcome by the present invention of a system and method for accurately mapping between camera coordinates and geo-coordinates, called geo-spatial registration. The present invention utilizes the imagery and terrain information contained in the geo-spatial database to precisely align the reference imagery with input imagery, such as dynamically generated video images or video mosaics, and thus achieve a high accuracy identification of locations within the scene. The geo-spatial reference database generally contains a substantial amount of reference imagery as well as scene annotation information and object identification information. When a sensor, such as a video camera, images a scene contained in the geo-spatial database, the system recalls a reference image pertaining to the imaged scene. This reference image is aligned very accurately with the sensor's images using a parametric transformation. Thereafter, other information (annotation, sound, and the like) that is associated with the reference image can easily be overlaid upon or otherwise associated with the sensor imagery. Applications of geo-spatial registration include text/graphical/audio annotations of objects of interest in the current video using the stored annotations in the reference database to augment and add meaning to the current video. These applications extend beyond the use of aerial videos into the challenging domain of video/image-based map and database indexing of arbitrary locales, like cities and urban areas.

BRIEF DESCRIPTION OF THE DRAWINGS

The teachings of the present invention can be readily understood by considering the following detailed description in conjunction with the accompanying drawings, in which:

FIG. 5 is a table comparing actual and computed locations in an image.

To facilitate understanding, identical reference numerals have been used, where possible, to designate identical elements that are common to the figures.

DETAILED DESCRIPTION

Figure 1:
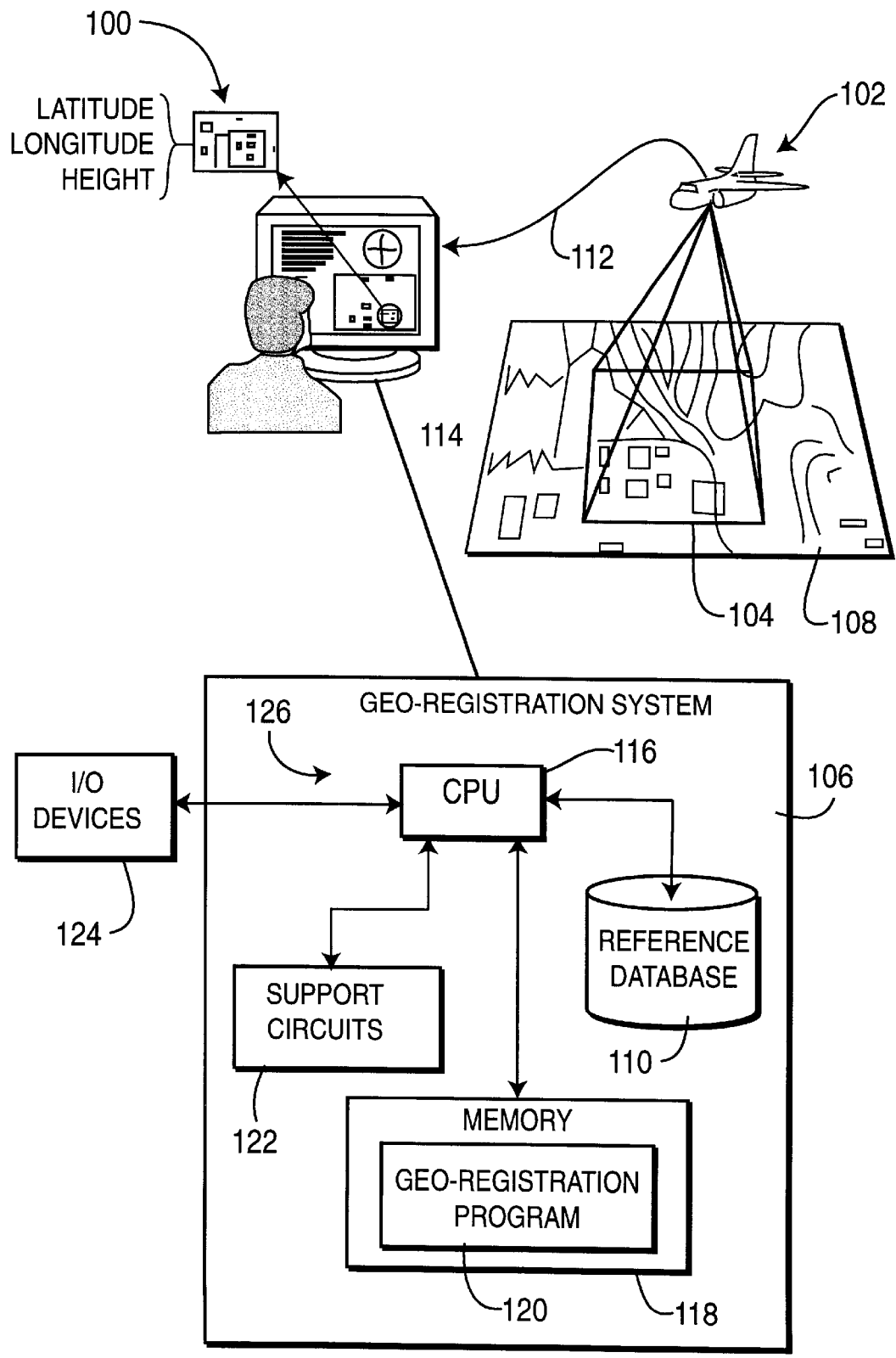
FIG. 1 depicts a conceptual view of a system incorporating the present invention.

FIG. 1 depicts a conceptual view of a comprehensive system 100 containing a geo-registration system 106 of the present invention. The figure shows a mobile platform 102 dynamically capturing "current" video images of a scene at a specific locale 104 within a large area 108. The system 106 identifies information in a reference database 110 that pertains to the current video images being transmitted along path 112 to the system 106. The system 106 "geo-registers" the current video images to the reference information or imagery stored within the reference database 110, i.e., the current video is aligned with geographically calibrated reference imagery and information. After "geo-registration", the footprints of the current video are shown on a display 114 to a user overlaid upon the reference imagery or other reference annotations. As such, reference information such as latitude/longitude/height of points of interest are retrieved from the database and are overlaid on the relevant points on the current video. Consequently, the user is provided with a comprehensive understanding of the scene that is being imaged.

The system 106 is generally implemented by executing one or more programs on a general purpose computer 126. The computer 126 contains a central processing unit (CPU) 116, a memory device 118, a variety of support circuits 122 and input/output devices 124. The CPU 116 can be any type of high speed processor such as a PENTIUM II manufactured by Intel Corporation or a POWER PC manufactured by Motorola Inc. The support circuits 122 for the CPU 116 include conventional cache, power supplies, clock circuits, data registers, I/O interfaces and the like. The I/O devices 124 generally include a conventional keyboard, mouse, and printer. The memory device 118 can be random access memory (RAM), read-only memory (ROM), hard disk storage, floppy disk storage, compact disk storage, or any combination of these devices. The memory device 118 stores the program or programs (e.g., geo-registration program 120) that are executed to implement the geo-registration technique of the present invention. When the general purpose computer executes such a program, it becomes a special purpose computer, i.e., the computer becomes an integral portion of the geo-registration system 106. Although the invention has been disclosed as being implemented as an executable software program, those skilled in the art will understand that the invention may be implemented in hardware, software or a combination of both. Such implementations may include a number of processors independently executing various programs and dedicated hardware such as application specific integrated circuits (ASICs).

Figure 2:
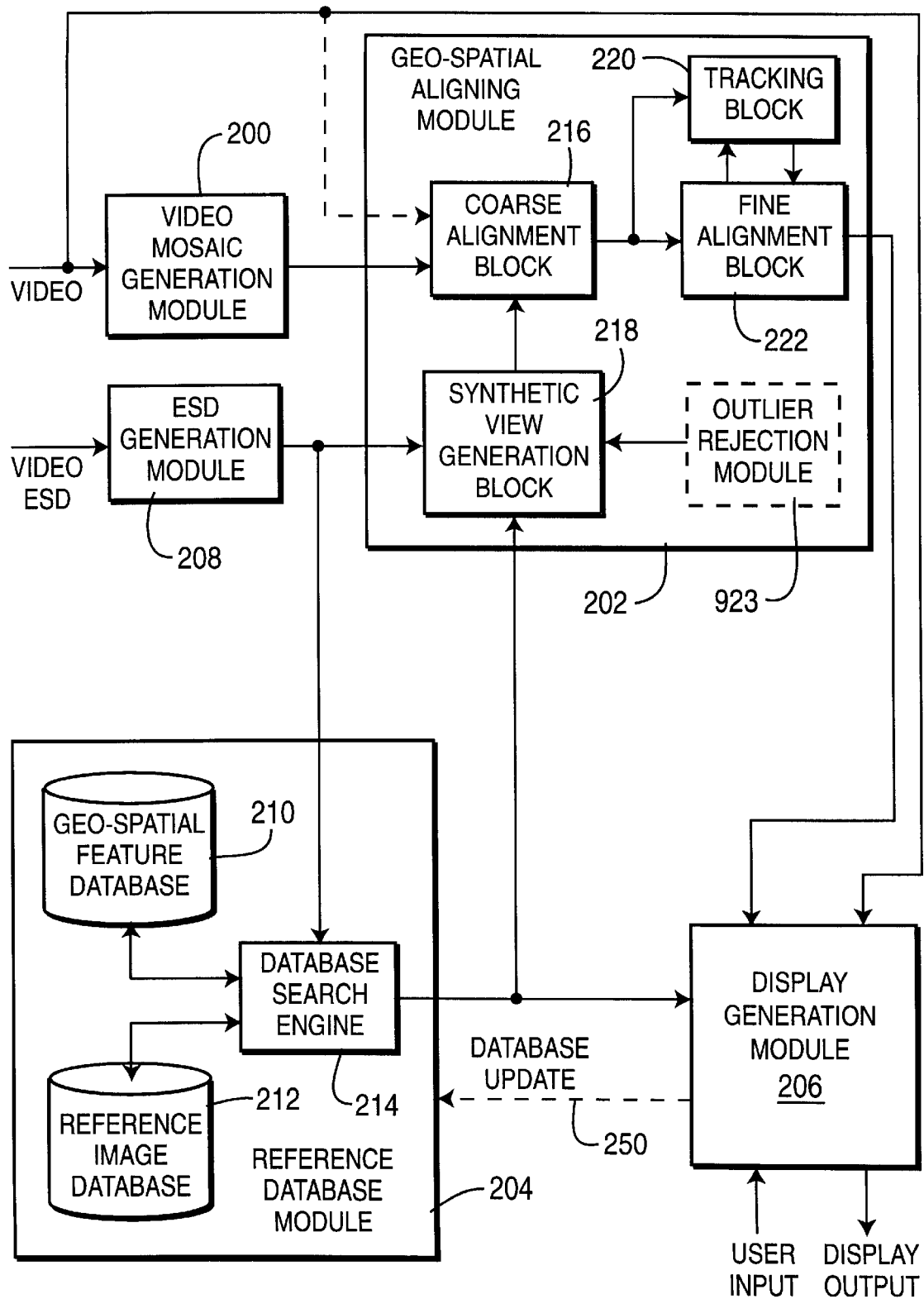
FIG. 2 depicts a functional block diagram of the geo-registration system of the present invention.

FIG. 2 depicts a functional block diagram of the geo-registration system 106 of the present invention. Illustratively, the system 106 is depicted as processing a video signal as an input image; however, from the following description those skilled in the art will realize that the input image (referred to herein as input imagery) can be any form or image including a sequence of video frames, a sequence of still images, a still image, a mosaic of images, a portion of an image mosaic, and the like. In short, any form of imagery can be used as an input signal to the system of the present invention.

The system 106 comprises a video mosaic generation module 200 (optional), a geo-spatial aligning module 202, a reference database module 204, and a display generation module 206. Although the video mosaic generation module 200 provides certain processing benefits that shall be described below, it is an optional module such that the input imagery may be applied directly to the geo-spatial aligning module 202. When used, the video mosaic generation module 200 processes the input imagery by aligning the respective images of the video sequence with one another to form a video mosaic. The aligned images are merged into a mosaic. A system for automatically producing a mosaic from a video sequence is disclosed in U.S. Pat. No. 5,649,032, issued Jul. 15, 1997, and incorporated herein by reference.

The reference database module 204 provides geographically calibrated reference imagery and information that is relevant to the input imagery. The camera platform (102 in FIG. 1) provides certain attitude information that is processed by the engineering sense data (ESD) module 208 to provide indexing information that is used to recall reference images (or portions of reference images) from the reference database module 204. A portion of the reference image that is nearest the video view (i.e., has a similar point-of-view of a scene) is recalled from the database and is coupled to the geo-spatial aligning module 202. The module 202 first warps the reference image to form a synthetic image having a point-of-view that is similar to the current video view, then the module 202 accurately aligns the reference information with the video mosaic. The alignment process is accomplished in a coarse-to-fine manner as described in detail below. The transformation parameters that align the video and reference images are provided to the display module 206. Using these transformation parameters, the original video can be accurately overlaid on the reference information, or vice versa, to produce a comprehensive view of the scene.

To obtain input imagery that can be indexed and aligned with respect to geographically calibrated reference imagery and information, as mentioned above, a "video mosaic" representing an imaged scene is produced to remove redundant information in the video image sequence. Video frames are typically acquired at 30 frames per second and contain a substantial amount of frame-to-frame overlap. For typical altitudes and speeds of airborne platforms, the overlap between adjacent frames may range from 4/5 to 49/50th of a single frame. Therefore, conversion of video frames into video mosaics is an efficient way to handle the amount of information contained in the incoming video stream. The invention exploits the redundancy in video frames by aligning successive video frames using low order parametric transformations such as translation, affine and projective transformations. The frame-to-frame alignment parameters enable the creation of a single extended view mosaic image that authentically represents all the information contained in the aligned input frames. For instance, typically 30 frames of standard NTSC resolution (720×480) containing about ten million pixels may be reduced to a single mosaic image containing only about two-hundred thousand to two million pixels depending on the overlap between successive frames. The video mosaic is subsequently used for geo-referencing and location.

Although many alignment algorithms are available that achieve image alignment of video imagery, the present invention uses a projective transformation to align the images. Additionally, the mosaicing process is extended to handle unknown lens distortion present in the imagery. Exemplary alignment processing for images (video images, in particular) is disclosed in U.S. Pat. No. 5,649,032. The result is a video mosaic representing the information contained in the sequence of video frames with any redundant information removed from the mosaic.

Often in aerial video streams, the lens distortion parameters must be explicitly modeled in the estimation process. A fundamental assumption made in the earlier work on mosaicing was that one image could be chosen as the reference image and the mosaic would be constructed by merging all other images to this reference image. The video mosaic generation module 200 extends the direct estimation algorithms of the prior art to use a reference coordinate system but not a reference image. The module 200 computes the motion parameters that warp all images to a virtual image mosaic in this reference coordinate system. Each pixel in this virtual image mosaic is predicted by intensities from more than one image. An error measure is minimized over the virtual image to compensate for lens distortion. The error measure may be the sum of the variances or the sum of the predicted pixel intensities at each pixel location. U.S. patent application Ser. No. 08/966,776, filed Nov. 10, 1997 and incorporated herein by reference, discloses the details of a lens distortion compensation procedure.

In order to compute the correspondences of the video frames and the unknown parameters simultaneously, the invention uses an error function that minimizes the variance in intensities of a set of corresponding points in the images, that map to the same ideal reference coordinate. Formally, the unknown projective transformation parameters for each frame, $A^1 \ldots A^N$, and the lens distortion parameter, $\gamma_1$ are solved using Equation 1.

$$\min_{A^1 \ldots A^N, \gamma_1} \sum_p \frac{1}{M(p)} \sum_i (I_i(p^i) - \bar{I}(p))^2 \quad (1)$$

where point $p^i$ in frame i is a transformation of a point p in the reference coordinate system, $\bar{I}(p)$ is the mean intensity value of all the $p^i$'s that map to p, and M(p) is a count of all such $p^i$'s. Therefore, given a point p in the reference coordinates, each term in the summation over i in Equation 1 is the variance of all the intensity values at points $p^i$ that map to point p.

In geo-spatial registration scenarios, the look angles of the imaging platform with respect to the Earth may be known with varying degrees of precision. The knowledge of these angles and other engineering sense data (ESD) can be used to correct for oblique look angles in order to generate a nadir view, i.e., use a process for ortho-correction. After performing ortho-correction, video mosaics may be created as described above. Ortho-corrected mosaics have the advantage that the view in an orthographic coordinate system is similar to that available in orthographic photographs.

Depending on the imaging scenario, ortho-corrected video mosaicing may have to account for the effects of parallax. The processing involved has to use the three-dimensional parallax present in the scene along with the warping transformation that accounts for the oblique angles of the camera platform. To account for parallax, the invention can use one of two approaches: (1) warp the imagery using any pre-existing Digital Elevation Map (DEM) information contained in the database or (2) account for parallax by computing the parallax using multiple images of the scene. Parallax computation from multiple video images and its use in the creation of parallax-corrected mosaics is disclosed in commonly assigned U.S. patent application Ser. No. 08/493,632, filed Jun. 22, 1995 and incorporated herein by reference.

In addition to image information, the sensor platform (102 in FIG. 1) also provides engineering sense data (ESD), e.g., global positioning system (GPS) information, INS, image scale, attitude, rotation, and the like, that is extracted from the signal received from the platform and provided to the geo-spatial aligning module 202 as well as the database module 204. Specifically, the ESD information is generated by the ESD generation module 208. The ESD is used as an initial scene identifier and sensor point-of-view indicator. As such, the ESD is coupled to the reference database module 204 and used to recall database information that is relevant to the current sensor video imagery. Moreover, the ESD can be used to maintain coarse alignment between subsequent video frames over regions of the scene where there is little or no image texture that can be used to accurately align the mosaic with the reference image.

More specifically, the ESD that is supplied from the sensor platform along with the video is generally encoded and requires decoding to produce useful information for the geo-spatial aligning module 202 and the reference database module 204. Using the ESD generation module 208, the ESD is extracted or otherwise decoded from the signal produced by the camera platform to define a camera model (position and attitude) with respect to the reference database. Of course, this does not mean that the camera platform and system can not be collocated, i.e., as in a hand held system with a built in sensor, but means merely that the position and attitude information of the current view of the camera is necessary.

Given that ESD, on its own, can not be reliably utilized to associate objects seen in videos (i.e., sensor imagery) to their corresponding geo-locations, the present invention utilizes the precision in localization afforded by the alignment of the rich visual attributes typically available in video imagery to achieve exceptional alignment rather than use ESD alone. For aerial surveillance scenarios, often a reference image database in geo-coordinates along with the associated DEM maps and annotations is readily available. Using the camera model, reference imagery is recalled from the reference image database. Specifically, given the camera's general position and attitude, the database interface recalls imagery (one or more reference images or portions of reference images) from the reference database that pertains to that particular view of the scene. Since the reference images generally are not taken from the exact same perspective as the current camera perspective, the camera model is used to apply a perspective transformation (i.e., the reference images are warped) to create a set of synthetic reference images from the perspective of the camera.

The reference database module 204 contains a geo-spatial feature database 210, a reference image database 212, and a database search engine 214. The geo-spatial feature database 210 generally contains feature and annotation information regarding various features of the images within the image database 212. The image database 212 contains images (which may include mosaics) of a scene. The two databases are coupled to one another through the database search engine 214 such that features contained in the images of the image database 212 have corresponding annotations in the feature database 210. Since the relationship between the annotation/feature information and the reference images is known, the annotation/feature information can be aligned with the video images using the same parametric transformation that is derived to align the reference images to the video mosaic.

The database search engine 214 uses the ESD to select a reference image or a portion of a reference image in the reference image database 204 that most closely approximates the scene contained in the video. If multiple reference images of that scene are contained in the reference image database 212, the engine 214 will select the reference image having a viewpoint that most closely approximates the viewpoint of the camera producing the current video. The selected reference image is coupled to the geo-spatial aligning module 202.

The geo-spatial aligning module 202 contains a coarse alignment block 216, a synthetic view generation block 218, a tracking block 220 and a fine alignment block 222. The synthetic view generation block 218 uses the ESD to warp a reference image to approximate the viewpoint of the camera generating the current video that forms the video mosaic. These synthetic images form an initial hypothesis for the geo-location of interest that is depicted in the current video data. The initial hypothesis is typically a section of the reference imagery warped and transformed so that it approximates the visual appearance of the relevant locale from the viewpoint specified by the ESD.

The alignment process for aligning the synthetic view of the reference image with the input imagery (e.g., the video mosaic produced by the video mosaic generation module 200, the video frames themselves that are alternatively coupled from the input to the geo-spatial aligning module 202 or some other source of input imagery) is accomplished using two steps. A first step, performed in the coarse alignment block 216, coarsely indexes the video mosaic and the synthetic reference image to an accuracy of a few pixels.

A second step, performed by the fine alignment block 222, accomplishes fine alignment to accurately register the synthetic reference image and video mosaic with a sub-pixel alignment accuracy without performing any camera calibration. The fine alignment block 222 achieves a sub-pixel alignment between the images. The output of the geo-spatial alignment module 202 is a parametric transformation that defines the relative positions of the reference information and the video mosaic. This parametric transformation is then used to align the reference information with the video such that the annotation/features information from the feature database 210 are overlaid upon the video or the video can be overlaid upon the reference images or both. In essence, accurate localization of the camera position with respect to the geo-spatial coordinate system is accomplished using the video content.

Finally, the tracking block 220 updates the current estimate of sensor attitude and position based upon results of matching the sensor image to the reference information. As such, the sensor model is updated to accurately position the sensor in the coordinate system of the reference information. This updated information is used to generate new reference images to support matching based upon new estimates of sensor position and attitude and the whole process is iterated to achieve exceptional alignment accuracy. Consequently, once initial alignment is achieved and tracking commenced, the geo-spatial alignment module may not be used to compute the parametric transform for every new frame of video information. For example, fully computing the parametric transform may only be required every thirty frames (i.e., once per second). Once tracking is achieved, the indexing block 216 and/or the fine alignment block 222 could be bypassed for a number of video frames. The alignment parameters can generally be estimated using frame-to-frame motion such that the alignment parameters need only be computed infrequently.

Figure 3:
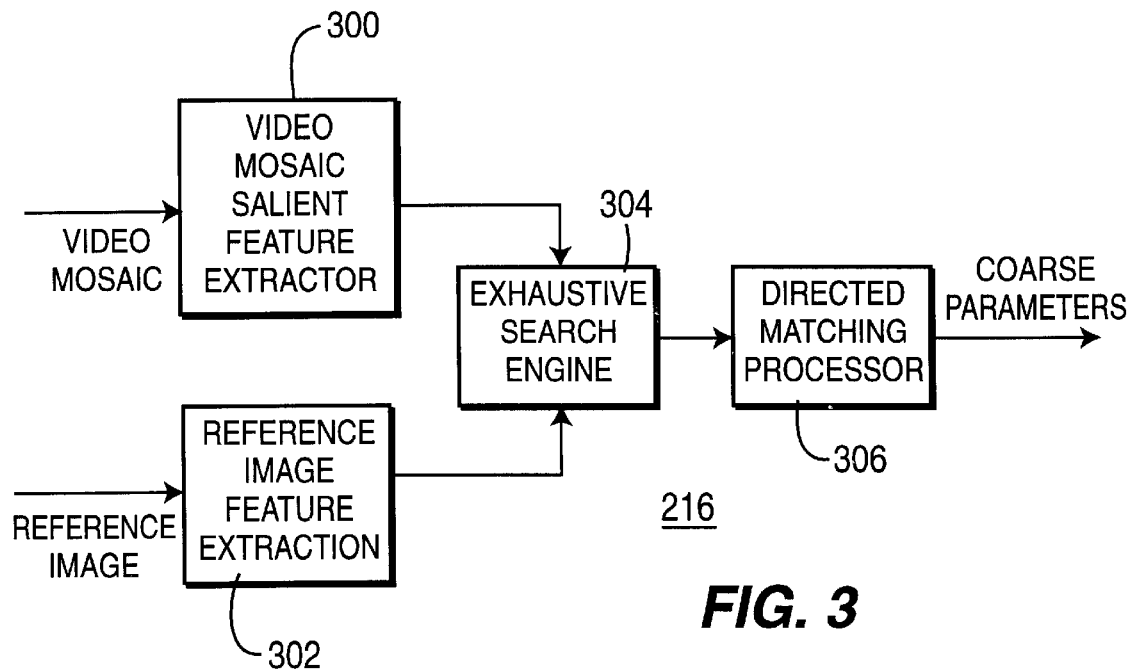
FIG. 3 depicts a functional block diagram of the coarse alignment block of the system in FIG. 2.

FIG. 3 depicts a functional block diagram of the coarse alignment block 216 which contains a video mosaic salient feature extractor 300, a reference image salient feature extractor 302, an exhaustive search engine 304, and a directed matching processor 306. The coarse indexing process locates a video mosaic within a reference image using visual appearance features. In principle, one could exhaustively correlate the intensities in the video mosaic and the reference image at each pixel and find the best match. However, due to the uncertainties in viewpoint defined by ESD and due to real changes in appearance between the reference imagery and the current video, it may not be possible to directly correlate intensities in the two images. The real changes in appearance may be due to change of reflectance of objects and surfaces in the scene (e.g., summer to fall, shadows and the like) and due to difference in illumination between the reference and the video imagery. Changes in appearance due to viewpoint are accounted for to a large extent by the process of warping the reference image to the ESD defined viewpoint. However, for robust matching and localization, indexing and matching must be resilient to uncertainties in ESD and to real changes in the imagery.

The coarse alignment block 216 computes features at multiple scales and multiple orientations that are invariant or quasi-invariant to changes in viewpoint. To facilitate such multiple scale computation, the reference images may be stored as image pyramids or image pyramids may be computed when the reference image is recalled from the database. In any event, the reference image scale and resolution should be comparable to that of the video mosaic. To achieve flexibility, the salient feature extractors 300 and 302 may both contains image pyramid generators such that both the video mosaic and the reference image are decomposed into image pyramids to facilitate rapid and accurate salient feature extraction.

Whether operating upon a full video mosaic and reference image or a level of a pyramid from the two images, the salient feature extractors 300 and 302 compute many salient locations both in the reference and video imagery. Such salient feature detection and processing is disclosed in T. Lindeberg, "Detecting Salient Blob-like Image Structures and Their Scales with a Scale-space Primal Sketch: A Method for Focus-of-attention," International Journal of Computer Vision, 1994. The salient feature locations are determined automatically based on distinctiveness of local image structure, i.e., the salient features may be low frequency blobs, high frequency corners or edges, or some combination of these features. The features that are considered salient depend on the scale and resolution of the imagery being processed. Even with the feature representations at salient locations only, there may be too much data for exhaustive matching of the salient features. Therefore, in the exhaustive search engine 304, fast indexing of the multi-dimensional visual features is used to eliminate most of the false matches, i.e., the salient features are pruned. Subsequently, the directed matching processor 306 performs directed matching of the small set of remaining candidate matches which leads to the correct coarse location of the video imagery in the reference coordinate system. The directed matching is performed using a "data tree" process that is disclosed in U.S. Pat. No. 5,159,647, issued Oct. 27, 1992, and incorporated herein by reference. The output of the coarse alignment block 216 is a set of coarse parameters for a parametric transform that aligns the reference image to the video mosaic.

Returning to FIG. 2, the coarse localization process of block 216 is used to initialize the process of fine alignment while accounting for the geometric and photometric transformations between the video and reference imagery. In general, the transformation between two views of a scene can be modeled by (i) an external coordinate transformation that specifies the 3D alignment parameters between the reference and the camera coordinate systems, and (ii) an internal camera coordinate system to image transformation that typically involves a linear (affine) transformation and non-linear lens distortion parameters. The fine alignment block 222 combines the external coordinate transformation and the linear internal transformation into a single 3D projective view transformation . This, along with the depth image and the non-linear distortion parameters, completely specifies the alignment transformation between the video pixels and those in the reference imagery. It is to be emphasized that one main advantage of the invention is that no explicit camera calibration parameters need be specified. This aspect tremendously increases the scope of applicability of a system incorporating the present invention to fairly arbitrary video camera platforms. The modeled video-to-reference transformation is applied to the solution of the precise alignment problem. The process involves simultaneous estimation of the unknown transformation parameters as well as the warped reference imagery that precisely aligns with the video imagery. Multi-resolution coarse-to-fine estimation and warping with Gaussian/Laplacian pyramids is employed.

More specifically, the following detailed description presents the equations used for aligning video imagery to a co-registered reference image and depth image (The equations for aligning video imagery to a co-registered orthophoto and DEM are similar). The formulation used is the plane+parallax model discussed in commonly assigned U.S. patent application Ser. No. 08/493,632, filed Jun. 22, 1995, and herein incorporated by reference.

The coordinates of a point in a video image are denoted by (x,y). The coordinates of the corresponding point in the reference image are given by $(X_r, Y_r)$. Each point in the reference image has a parallax value k. The parallax value is computed from the dense depth image which is co-registered with the reference image.

There are fifteen parameters $a_1 \ldots a_{15}$ used to specify the alignment, these parameters include:

parameters $a_1 \ldots a_9$ specify the motion of a virtual plane;

parameters $a_{10} \ldots a_{12}$ specify the 3D parallax motion;

parameter $a_{13}$ specifies the lens distortion; and parameters $a_{14} \ldots a_{15}$ specify the center for lens distortion.

First the reference image coordinates $(X_r, Y_r)$ are projected to ideal video coordinates $(X_I, Y_1)$ by using equation 2:

$$X_I = \frac{(a_1 * X_r + a_2 * Y_r + a_3 + k * a_{10})}{(a_7 * X_r + a_8 * Y_r + a_9 + k * a_{12})} \quad (2)$$

$$Y_I = \frac{(a_4 * X_r + a_5 * Y_r + a_6 + k * a_{11})}{(a_7 * X_r + a_8 * Y_r + a_9 + k * a_{12})}$$

Note, since, the right hand side in the above two equations is a ratio of two expressions, the parameters $a_1 \ldots a_{12}$ can only be determined up to a scale factor. We typically make parameter $a_9 = 1$ and solve for the remaining 11 parameters. The ideal video coordinates $(X_I, Y_I)$ are related to the measured video coordinates (x,y) by equations 3 and 4:

$$x = X_1 + a_{13} * (X_1 - a_{14}) * r^2$$

$$y = Y_1 + a_{13} * (Y_1 - a_{15}) * r^2 \quad (3)$$

where:

$$r^2 = (X_I - a_{14})^2 + (Y_1 - a_{15})^2 \quad (4)$$

The lens distortion parameters $a_{13} \ldots a_{15}$ may be computed at the video mosaicing stage. In that case, the estimated values are used. Alternatively, the lens distortion parameters can be simultaneously computed with the projective $a_1 \ldots a_8$ and epipolar parameters $a_{10} \ldots a_{12}$. The parallax value {In the case of the reference image being an orthophoto with a corresponding DEM, k is equal to the DEM value} k, at any reference, location is calculated from the depth z at that location using equation 5, $$k = \frac{(\bar{z} - z) * z}{z * \sigma_z} \quad (5)$$

where $\bar{z}$ and $\sigma_z$ are the average and standard deviation of the depth image values.

The reference imagery and the video are typically acquired at different times. Hence, to correlate the video to the reference imagery, the fine alignment block may optionally perform the following transformations to enhance the alignment accuracy. The fine alignment block 222 first computes and matches the histograms of the video mosaic to the predicted portion of the reference image. This allows the system to modify the video mosaic, so that it has a similar histogram as the reference image. Finally, the invention computes the Laplacian pyramids of the reference image and the modified video mosaic. As discussed below, the alignment parameters are then computed by correlating these two images.

To accurately register the video image to the reference image, the fine alignment block 222 uses a hierarchical direct registration technique. This technique first constructs filter pyramids from each of the two input images, and then estimates the motion parameters in a coarse-fine manner. Within each level the Sum of Squared Difference (SSD) measure integrated over user selected regions of interest is used as a match measure. This measure is minimized with respect to the unknown transformation parameters $a_1 \ldots a_{15}$. The SSD error measure for estimating the transformation parameters within a region is given by equation 6:

$$E(\{A\}) = \sum_x (R(x) - I(Ax))^2 \quad (6)$$

where x=(x,y) denotes the spatial image position of a point, I the (Laplacian pyramid) image intensity and (Ax) denotes the image transformation at that point (see equations 3 and 4). The error is computed over all the points within the region. The optimization is done in an iterative manner, at each level of the pyramid using the Levenberg Marquardt optimization technique. This algorithm is referred to as the "projective pose" algorithm.

If the Digital Elevation Map (DEM) information is not known apriori, then its values are also treated as unknowns in the procedure for optimizing the error function given in equation (6). The optimization is accomplished using the coarse to fine strategy over the levels of the pyramid. At each level of the pyramid, the Levenberg Marquardt optimization technique is used. This is based on the 3D parallax computation algorithm described in commonly assigned U.S. patent application Ser. No. 08/493,632. The alignment algorithm used in this case can be referred to as the "plane+parallax" technique.

Note, for video imagery where the terrain imaged is relatively flat with respect to the height of the video sensor, parallax effects will be minimal. In this case, the video imagery may be aligned to the reference imagery using just a "projective" transformation and there is no need to compute any 3D parallax. The pyramid based algorithm used in this case is referred to as the "projective" algorithm.

Figure 4:
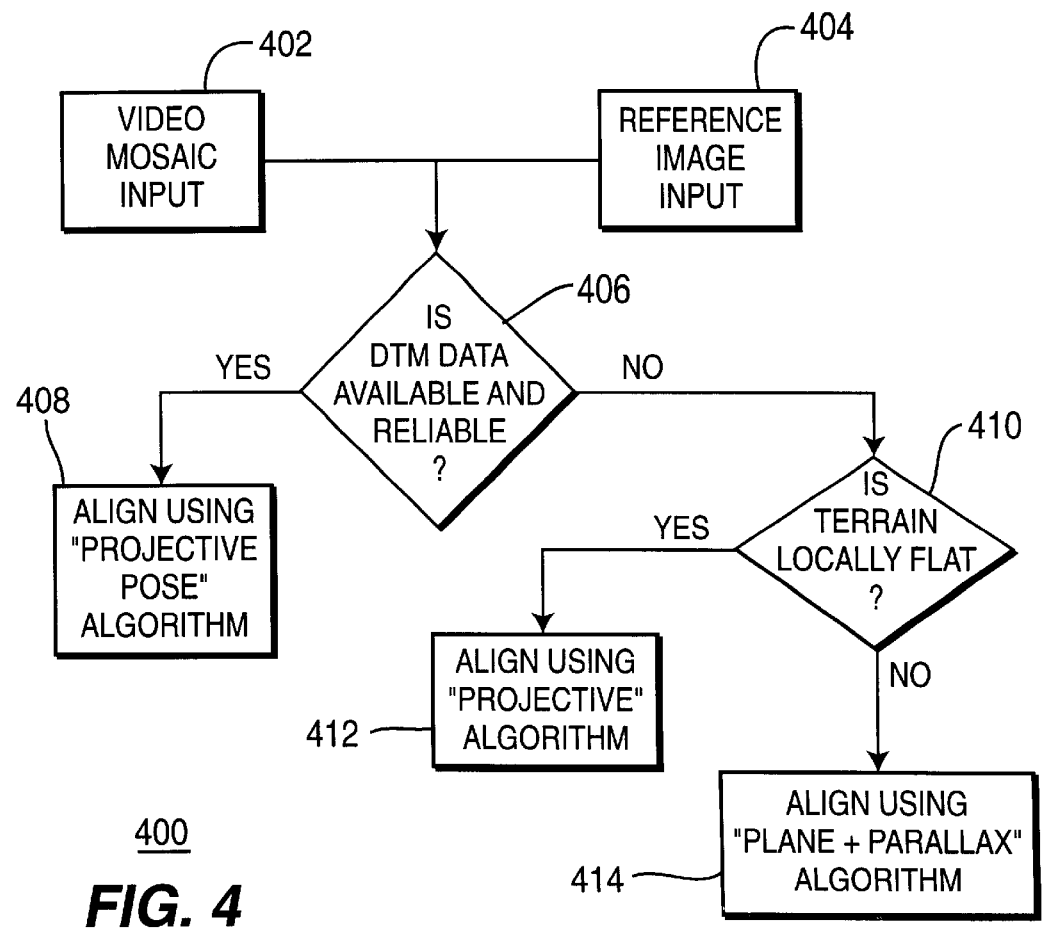
FIG. 4 depicts a flow diagram of the fine alignment block of FIG. 2.

FIG. 4 depicts a process 400 by which the geo-registration program can select the alignment technique that best suits the image content. The video mosaic is input at step 402 and the reference image is input at step 404. The process queries, at step 406, whether the DTM data is available and reliable. If the query is affirmatively answered, the process proceeds to step 408 where the "projective pose" algorithm is used to accurately align the video mosaic and the reference image. On the other hand, if the query at step 406 is negatively answered, the process proceeds to step 410. At step 410, the process queries whether the terrain is locally flat. If the query is affirmatively answered, the process proceeds to step 412 where the video mosaic is aligned with the reference image using the "projective" algorithm. If the terrain is not locally flat, the process proceeds to step 414 where the "plane+parallax" algorithm is used to align the video mosaic and the reference image.

In order to assess the approximate accuracy of geo-referencing, a few points were manually selected in a video frame and the corresponding points manually identified in the reference image. Points in the reference image corresponding to those in the video were also identified using the geo-registration algorithms. FIG. 5 contains a table indicating the accuracy of located points in the reference with respect to the hand selected ones. Second and third columns in the table show the coordinates of the selected video points and the subsequent two columns show the corresponding points selected manually in the reference image. The last two columns show the points computed in the reference image by the geo-registration algorithm. Most correspondences are within 1 pixel accuracy with respect to the manually selected locations.

Once, the alignment parameters have been computed, the display generation module 206 can warp the reference image to the video image or vice versa, accurately overlay certain reference information onto the video image, and the like. In one embodiment of the invention the video images can be warped to the reference image. These video images can then be merged to construct geo-mosaics (geo-referenced video mosaics). These mosaics can be used to update the reference imagery. The video mosaics that are warped in this manner are coupled to the reference database module 204 along path 250 in FIG. 2.

For annotation and other visualization tasks, it is important for the user to be able to map points from the video to the reference image and vice versa. To map points from the reference image to the video, the invention uses equations 2 and 3 and computes the values on the right hand side. However, to map a video point to the reference image, equations 2 and 3 are solved using Newton's method in two steps, first equation 3 is solved and then use the results from equation 3 to solve equation 2.

Similarly for warping the video image to the reference image, the invention can use reverse warping with bilinear interpolation. However, to warp the reference image to appear in the video image coordinates, the invention must use forward warping. Point mappings in the forward warping process are computed using the above technique.

To accomplish the overlay process, the display module contains a video mixer that combines the video and database information on the operator's reference overview image monitor window. Additionally, the overlay may include attached sound/text references for point and click recall of additional information pertaining to the imaged scene. As such, the video images can be mapped to the geo-spatial reference information or the geo-spatial reference information can be mapped to the video. This flexible integration of currently generated video and database information provides a rich source of accessible information for many applications.

The annotation information, the video and the transformation parameters are provided to the display module 206. The display module produces various user defined display formats. For example, the video or video mosaic can be overlaid atop the reference images or vice versa, annotation data can be overlaid atop the video, reference images and annotation information can both be overlaid atop the video images and so on. The database may further contain DEM maps and multi-modal annotations such as graphics, text, audio, maps and the like. Additionally, the video view can be used as an initial view of a scene, then the reference database imagery could be displayed as a synthetic view of the scene extrapolated from the original view as a virtual camera moves from the initial view through the scene, i.e., a synthetic "fly through."

Furthermore, objects in the video can be identified by the user and marked with a cursor. The system can accurately geo-locate the selected point with respect to the reference coordinate system.

Although various embodiments which incorporate the teachings of the present invention have been shown and described in detail herein, those skilled in the art can readily devise many other varied embodiments that still incorporate these teachings.

What is claimed is:

1. A system for performing geo-spatial registration of an input image and geographically calibrated reference imagery comprising:

a reference database module containing geographically calibrated reference imagery, for producing geographically calibrated reference imagery relating to imagery in said input image; and an alignment module, coupled to said reference database module, for aligning said input image to said geographically calibrated reference imagery, where said alignment module comprises:

a coarse alignment block, coupled to said reference database module and a sensor attitude source, for aligning said geographically calibrated reference imagery to alignment with said input image by using attitude information generated from said sensor attitude source, where said attitude information pertains to a sensor producing said input image, and a fine alignment block, coupled to said coarse alignment block, for accurately aligning said input image to said geographically calibrated reference imagery to a sub-pixel accuracy.

2. The system of claim 1 further comprising:

a mosaic generation module for producing an image mosaic as said input image, where said image mosaic is generated from a sequence of sensor images.

3. The system of claim 1 wherein said alignment module further comprises a synthetic view generation block for warping said geographically calibrated reference imagery to have a viewpoint similar to a viewpoint of said sensor.

4. The system of claim 1 wherein said sensor is a video camera.

5. The system of claim 1 further comprising a tracking block, coupled to said fine alignment block, for tracking said parametric transformation such that a new parametric transformation does not have to be computed for each new input image.

6. The system of claim 1 further comprising a display module for generating a display that uses a parametric transformation to align said geographically calibrated reference imagery with said input image and simultaneously display said geographically calibrated reference imagery and said input image.

7. The system of claim 1 wherein said coarse alignment block further comprises:

a input image salient feature extractor;

a reference image salient feature extractor;

an exhaustive search engine; and a directed matching processor.

8. The system of claim 1 wherein said fine alignment block further comprises:

a fine alignment process selector that selects an alignment process best suited for the input image.

9. The system of claim 8 wherein the fine alignment selector can select an alignment process from the following: a projective pose process, a projective process, or a plane+parallax process.

10. A method for performing geo-spatial registration of an input image and geographically calibrated reference imagery comprising:

producing geographically calibrated reference imagery relating to imagery in said input image; and aligning said input image to said geographically calibrated reference imagery, where said aligning comprises coarsely aligning said geographically calibrated reference imagery to alignment with said input image by using attitude information generated from a sensor attitude source, where said attitude information pertains to a sensor producing said input image, and accurately aligning said input image to said geographically calibrated reference imager to a sub-pixel accuracy.

11. The method of claim 10 further comprising the step of:

producing an image mosaic as said input image, where said image mosaic is generated from a sequence of sensor images.

12. The method of claim 10 wherein said aligning step further comprises warping said geographically calibrated reference imagery to have a viewpoint similar to a viewpoint of said sensor.

13. The method of claim 10 further comprising the step of:

tracking a parametric transformation such that a new parametric transformation does not have to be computed for each new input image.

14. The method of claim 10 further comprising the step of:

generating a display that uses a parametric transformation to align said geographically calibrated reference imagery with said input image and simultaneously display said geographically calibrated reference imagery and said input image.

15. The method of claim 10 wherein said accurate aligning step further comprises the step of:

selecting an alignment process best suited for the input image.

16. The method of claim 10 further comprising the step of:
determining geographic coordinates of a user selected point within said input image.

17. The method of claim 10 further comprising the step of:
displaying the input image warped and superimposed on the geographically calibrated reference imagery.

18. The method of claim 10 further comprising the step of:
updating the geographically calibrated reference imagery in a reference database with information from the input image.

19. The method of claim 10 further comprising the step of:
generating a synthetic fly through starting at a current viewpoint of the input image and continuing using the geographically calibrated reference imagery.

20. A digital storage medium containing a computer program that, when executed by a general purpose computer, forms a specific purpose computer that performs the steps of:

producing geographically calibrated reference imagery relating to imagery in an input image; and aligning said input image to said geographically calibrated reference imagery, where said aligning comprises coarsely aligning said geographically calibrated reference imagery to alignment with said input image by using attitude information generated from a sensor attitude source, where said attitude information pertains to a sensor producing said input image, and accurately aligning said input image to said geographically calibrated reference imagery to a sub-pixel accuracy.

21. The medium of claim 20 further performing the step of:

producing an image mosaic as said input image, where said image mosaic is generated from a sequence of sensor images.

* * * * *